(12) United States Patent
Kimura (10) Patent No.: US 10,108,379 B2
(45) Date of Patent: Oct. 23, 2018

(54) INFORMATION PROCESSING APPARATUS, METHOD OF CONTROLLING THE SAME AND STORAGE MEDIUM

(71) Applicant: CANON KABUSHIKI KAISHA, Tokyo (JP)

(72) Inventor: Tomohiro Kimura, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/091,851

(22) Filed: Apr. 6, 2016

(65) Prior Publication Data

US 2016/0313950 A1  Oct. 27, 2016

(30) Foreign Application Priority Data

Apr. 22, 2015 (JP) ................. 2015-087785

(51) Int. Cl.
| | | |
|---|---|---|
| *H04N 1/04* | (2006.01) | |
| *G06F 3/12* | (2006.01) | |
| *H04W 48/10* | (2009.01) | |
| *H04W 4/80* | (2018.01) | |

(52) U.S. Cl.
CPC .......... *G06F 3/1205* (2013.01); *G06F 3/1253* (2013.01); *H04W 4/80* (2018.02); *H04W 48/10* (2013.01); *G06F 3/1203* (2013.01); *G06F 3/1236* (2013.01); *G06F 3/1285* (2013.01); *G06F 3/1292* (2013.01)

(58) Field of Classification Search
CPC .... G06F 3/1205; G06F 3/1292; G06F 3/1236; G06F 3/1253

USPC ......................... 358/1.15, 1.14, 1.9
See application file for complete search history.

(56) References Cited

U.S. PATENT DOCUMENTS

| | | | |
|---|---|---|---|
| 8,913,280 B2 | 12/2014 | Kimura | ........................ 358/1.15 |
| 9,055,172 B2 | 6/2015 | Kimura | ........................ 358/1.13 |
| 2010/0069008 A1* | 3/2010 | Oshima | .................. H04W 4/02 455/41.3 |
| 2010/0082779 A1* | 4/2010 | Min | .................. H04L 29/12273 709/220 |
| 2012/0162700 A1* | 6/2012 | Miyazaki | .............. G06F 3/1204 358/1.15 |

(Continued)

FOREIGN PATENT DOCUMENTS

| | | | | |
|---|---|---|---|---|
| JP | 2006-195765 | * | 7/2006 | ............... G06F 3/12 |
| JP | 2014-120173 | | 6/2014 | |

*Primary Examiner* — Houshang Safaipour
(74) *Attorney, Agent, or Firm* — Fitzpatrick, Cella, Harper & Scinto (57) ABSTRACT

A printing apparatus (information processing apparatus) receives setting information for communication with a server from a mobile terminal by a BLE communication, and performs a communication setting for communication with the server based on the received setting information. The printing apparatus sends a beacon packet by BLE, and, by receiving a connection request from a mobile terminal that received the beacon packet, establishes a BLE connection with the mobile terminal. The printing apparatus receives the setting information from the mobile terminal via the established BLE connection, and performs a network setting for performing communication via a network. When the network setting is completed, the printing apparatus connects to the server, and obtains from the server setting information necessary for setting itself.

24 Claims, 5 Drawing Sheets

(56) References Cited

U.S. PATENT DOCUMENTS

| | | | |
|---|---|---|---|
| 2014/0013139 A1 | 1/2014 | Kimura | 713/323 |
| 2014/0146336 A1* | 5/2014 | Yagi | H04N 1/00904 |
| | | | 358/1.13 |
| 2015/0195147 A1* | 7/2015 | Jee | H04W 76/043 |
| | | | 715/740 |
| 2015/0229601 A1* | 8/2015 | Frey | H04L 41/0869 |
| | | | 709/221 |
| 2016/0183042 A1* | 6/2016 | Weizman | H04W 4/02 |
| | | | 455/456.1 |
| 2017/0134609 A1* | 5/2017 | Park | H04N 1/32776 |

* cited by examiner

INFORMATION PROCESSING APPARATUS, METHOD OF CONTROLLING THE SAME AND STORAGE MEDIUM

BACKGROUND OF THE INVENTION

Field of the Invention

The present invention relates to an information processing apparatus, a method of controlling the same, and a storage medium.

Description of the Related Art

In recent years, in information processing apparatuses such as OA devices, home electronic devices, that are equipped with a short-range wireless communication function such as one for Bluetooth communication, or the like, apparatuses that support a Bluetooth Low Energy (BLE) standard are increasing. This BLE is one extension standard of a Bluetooth standard. For example, Japanese Patent Laid-Open No. 2014-120173 discloses a system in which an information processing apparatus uses BLE to provide a service to a mobile terminal.

Meanwhile, a technique is known in which, for optimization of an initial installation time in an information processing apparatus, as typified by a printing apparatus, setting information necessary for setting of the information processing apparatus is stored in advance in a server on a network, and the server is used to perform initial setting of the information processing apparatus. In accordance with this technique, when setting to connect to the network is performed and communication with the server becomes possible, the information processing apparatus obtains the setting information from the server on the network, and initial setting is performed based on the obtained setting information.

However, in the case of the information processing apparatus obtaining the setting information from the server by the above technique, it is necessary for an installer such as a service person to individually perform, with respect to the information processing apparatus, at a minimum a communication setting (network) necessary to connect to the network and communicate with the server. For example, when simultaneously performing such a setting for many information processing apparatuses, the installer needs to manually perform a setting for each information processing apparatus. For this reason, it is required that it be possible to more easily set an information processing apparatus.

SUMMARY OF THE INVENTION

The present invention was conceived in view of the above described issues. The present invention provides a technique for simplifying an operation necessary to use a server apparatus on a network to perform setting of an information processing apparatus.

According to one aspect of the present invention, there is provided an information processing apparatus that connects to a server to obtain setting information from the server, the apparatus comprising: a wireless communication unit configured to receive from an external apparatus network setting information to set for the information processing apparatus; a setting unit configured to set the network setting information received by the wireless communication unit for the information processing apparatus; and an obtaining unit configured to connect to the server to obtain the setting information from the server in a case where setting of the network setting information is completed.

According to another aspect of the present invention, there is provided a method for controlling an information processing apparatus that connects to a server to obtain setting information from the server, the method comprising: receiving from an external apparatus network setting information to set for the information processing apparatus; setting the received network setting information for the information processing apparatus; and connecting to the server to obtain the setting information from the server in a case where setting of the network setting information is completed.

According to still another aspect of the present invention, there is provided a non-transitory computer-readable storage medium storing a computer program for causing a computer to execute a method for controlling an information processing apparatus that connects to a server to obtain setting information from the server, the method comprising: receiving from an external apparatus network setting information to set for the information processing apparatus; setting the received network setting information for the information processing apparatus; and connecting to the server to obtain the setting information from the server in a case where setting of the network setting information is completed.

In accordance with the present invention, an operation necessary to use a server apparatus on a network to perform setting of an information processing apparatus can be simplified.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Figure 1:
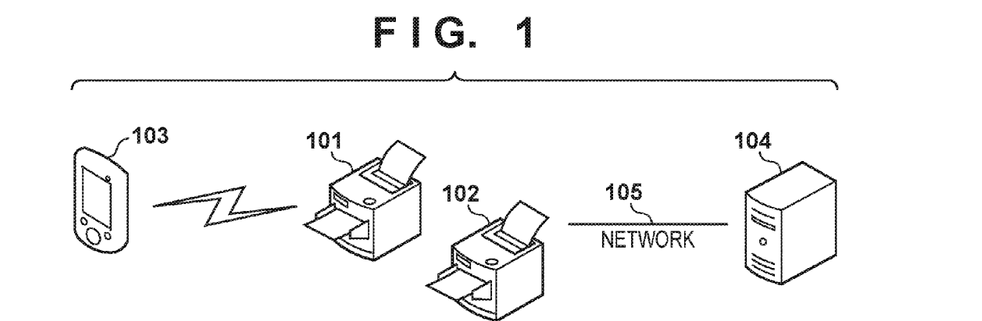
FIG. 1 is a view for illustrating an example configuration of an information processing system.

FIG. 1 is a view for illustrating an example configuration of an information processing system. The information processing system in the present embodiment includes, as an example, two printing apparatuses 101, 102, one mobile terminal 103, and one server 104. Any number of printing apparatuses and any number of mobile terminals can be arranged in the information processing system. The printing apparatuses 101, 102 are printing apparatuses capable of performing print processing, and are examples of an information processing apparatus. Also, the mobile terminal 103 is a mobile terminal such as a mobile telephone, a smart phone, a tablet PC or the like, and is an example of a wireless communication apparatus. Note that the printing apparatuses 101, 102 may be, for example, multi-function peripherals (MFPs) having various functions, such as a scanning function, or a FAX function, and not only a printing function.

Here, as shown in FIG. 1, an environment in which two printing apparatuses 101, 102 are newly installed is envisioned. The printing apparatuses 101, 102 are in an initial state in which a setting modification has not been performed after a factory shipping, and in a state in which a setting for performing communication through a network 105 such as a wired LAN has not been performed. For this reason, it is necessary for a service person (an installer) to operate the printing apparatuses 101, 102 as an operator and perform a setting (initial setting) of the printing apparatuses 101, 102.

In the present embodiment, the service person performs a setting of the printing apparatuses 101, 102 using the server 104, by using the mobile terminal 103 to cause the printing apparatuses 101, 102 to enter a state in which communication with the server 104 through the network 105 can be performed. Specifically, the printing apparatuses 101, 102 receive setting information for communication with the server 104 from the mobile terminal 103 by a wireless communication, and perform a communication setting for communication with the server 104 based on the received setting information. That is, the printing apparatuses 101, 102 perform a network setting for performing communication through the network 105 based on the setting information. Furthermore, after the communication setting is completed and the communication with the server 104 becomes possible, the printing apparatuses 101, 102 connect to the server 104 and obtain, from the server 104, additional setting information (i.e. the setting information required for setting of themselves) other than the setting information received from the mobile terminal 103. Note that each of the printing apparatuses 101, 102 can cause the obtained setting information to be reflected in their own settings after the required setting information is obtained from the server 104.

In this way, the service person can use the mobile terminal 103 to perform a communication setting for the printing apparatuses 101, 102 without needing to perform it manually and individually. Each of the printing apparatuses 101, 102 can obtain the required setting information to perform a setting of itself from the server 104 when the communication setting is completed and communication with the server 104 becomes possible. Therefore, according to the procedure described above, it is possible to simplify an operation of a service person that is necessary to use the server 104 on the network to set the printing apparatuses 101, 102.

In the present embodiment, the mobile terminal 103 holds in advance the setting information for communicating with the server 104 through the network 105 in order to provide the setting information to the printing apparatuses 101, 102 by wireless communication. Such setting information may be downloadable for example from a server such as the server 104 to the mobile terminal 103 through a network, or may be set in the mobile terminal 103 by an operation input of a service person.

Also, the server 104 holds in advance setting information corresponding to the newly installed printing apparatuses 101, 102. The server 104 is connected to the network 105 and can communicate with an external apparatus through the network 105. For example, when the printing apparatuses 101, 102 enter a state in which the above described network setting is completed and communication is possible, the server 104 becomes able to communicate with the printing apparatuses 101, 102. The server 104 can be configured by any form of server such as a cloud server, an on-premises server, or a device server in a printing apparatus that is already installed. Note that the server 104 may hold in advance setting information to be used for communication with the server 104 and to be provided to the mobile terminal 103 through the network as described above.

The mobile terminal 103 and the printing apparatuses 101, 102 have a communications function according to a Bluetooth (registered trademark) (hereinafter, referred to as "BT") standard which is one standard for short-range wireless communication. The mobile terminal 103 and the printing apparatuses 101, 102 furthermore have a communications function according to a Bluetooth Low Energy (BLE) standard, which is one extension standard of the BT standard and which is a standard for performing communication with lower power consumption than the BT standard. In the present embodiment, the mobile terminal 103 and the printing apparatuses 101, 102 transmit/receive setting information by a wireless communication (BLE communication) according to the BLE standard. Note, in the present specification, that wireless communication according to the BT standard (BT communication) includes wireless communication according to the BLE standard (the BLE communication), which is an extension standard of the BT standard.

<Hardware Configuration of Printing Apparatus>

Figure 2A:
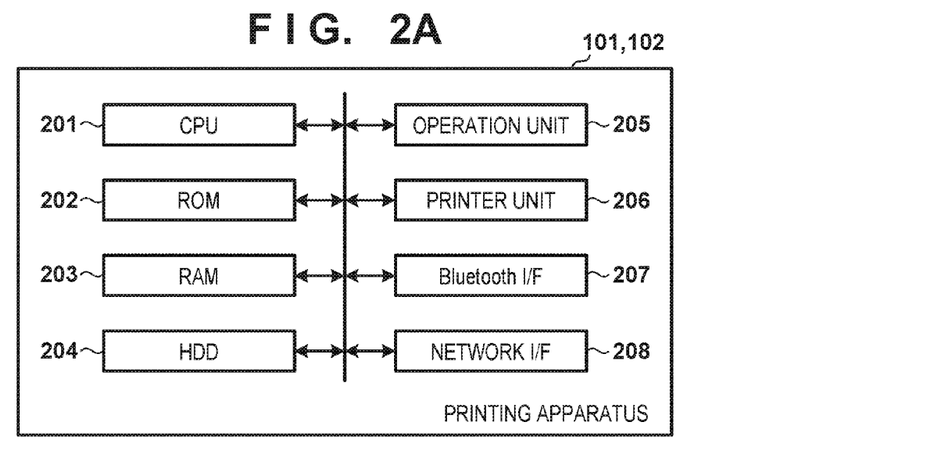
FIG. 2A is a block diagram for showing an example of a hardware configuration of a printing apparatus.

FIG. 2A is a block diagram for showing an example of a hardware configuration of the printing apparatuses 101, 102. The printing apparatuses 101, 102 include a CPU 201, a ROM 202, a RAM 203, an HDD 204, an operation unit 205, a printer unit 206, a BT interface (I/F) 207, and a network I/F 208, and these devices are connected to an internal bus. The devices connected to the internal bus can communicate with each other through the internal bus. Note that explanation is given below for a configuration and an operation of the printing apparatus 101, but the same applies to the printing apparatus 102.

The CPU 201 controls the operation of the entirety of the printing apparatus 101. The CPU 201, by reading and executing a control program stored in the ROM 202, performs various controls such as control of printing or transmission control. The RAM 203 is a volatile storage device and used as a work area for the CPU 201 to execute various programs, or as a temporary storage area where various data is stored temporarily. The HDD 204 is a non-volatile storage device, and various data such as image data or various programs are stored therein.

The operation unit 205 has a display (display module) that operates as a touch panel on which a user can perform a touch operation by a finger. The printer unit 206 prints an image on a sheet based on image data received through the internal bus.

The BT I/F 207 is a communication interface for performing wireless communication with an external apparatus in accordance with the BT standard. The printing apparatus 101 can use the BT I/F 207 to perform wireless communication in accordance with the BT standard with an external apparatus (wireless communication apparatus), such as the mobile terminal 103, that similarly includes a BT I/F. The network I/F 208 is an NIC (Network Interface Card) for connecting to the network 105 and a communication interface for performing communication with the external apparatus connected to the network 105.

<Hardware Configuration of Mobile Terminal>

Figure 2B:
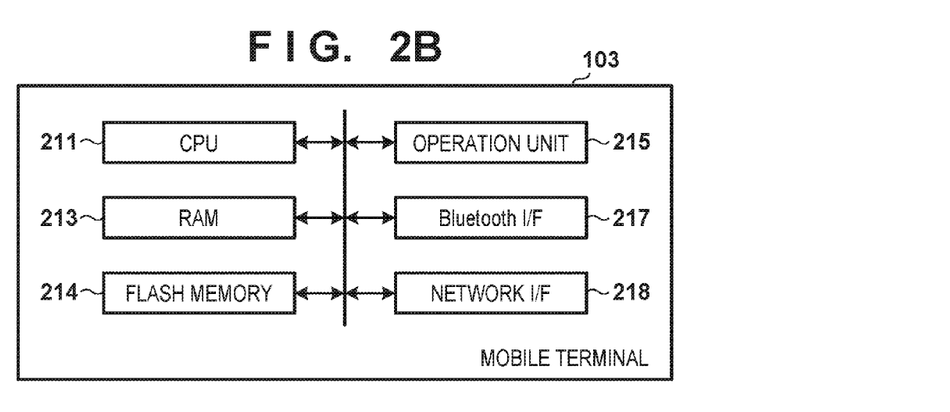
FIG. 2B is a block diagram for showing an example of a hardware configuration of a mobile terminal.

FIG. 2B is a block diagram for showing an example of a hardware configuration of the mobile terminal 103. The mobile terminal 103 includes a CPU 211, a RAM 213, a flash memory 214, an operation unit 215, a BT I/F 217, and a network I/F 218, and these devices are connected to an internal bus. The devices connected to the internal bus can communicate with each other through the internal bus.

The CPU 211 controls operation of the mobile terminal 103 overall by reading and executing a control program stored in the flash memory 214. The RAM 213 is a volatile storage device and used as a work area for the CPU 211 to execute various programs, or as a temporary storage area where various data is stored temporarily. The flash memory 214 is a non-volatile storage device in which various data or various programs are stored. The operation unit 215 has a display (display module) that operates as a touch panel on which a user can perform a touch operation by a finger.

The BT I/F 217 is a communication interface for performing wireless communication with an external apparatus in accordance with the BT standard. The printing apparatus 101 can use the BT I/F 217 to perform wireless communication in accordance with the BT standard with an external apparatus such as the mobile terminal 103, that similarly includes a BT I/F. The network I/F 218 is a communication interface for performing wireless communication with the external apparatus in accordance with a wireless LAN (WLAN) standard, and for example by performing a wireless connection to a wireless router (not shown), communication with an external apparatus can be performed through the wireless router. For example, the mobile terminal 103 may download the setting information provided to the printing apparatuses 101, 102 from the server 104 as described above by communicating with the server 104 through such a wireless router.

<Software Configuration of Printing Apparatus>

Figure 3A:
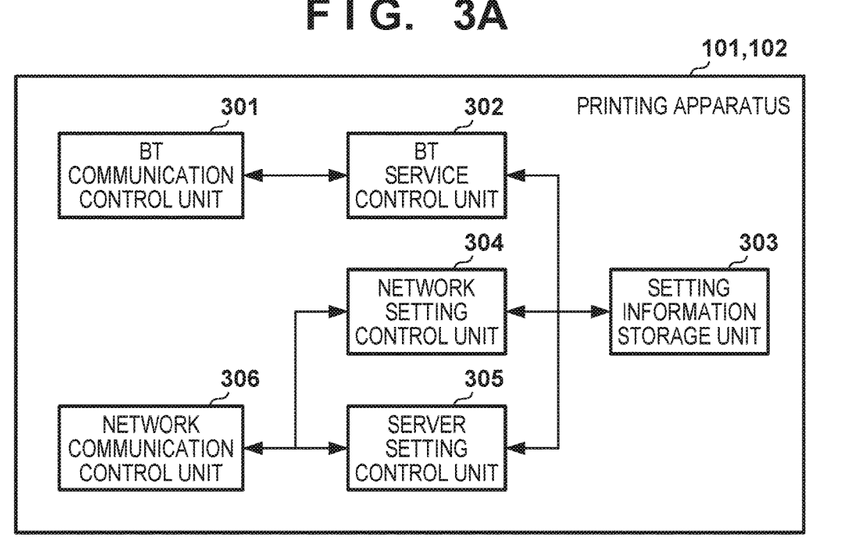
FIG. 3A is a block diagram for showing an example of a software configuration of the printing apparatus.

FIG. 3A is a block diagram for showing an example of a software configuration of the printing apparatuses 101, 102. Functions of each block illustrated in FIG. 3A and processing executed by each block is realized in the printing apparatuses 101, 102 by the CPU 201 executing the control program.

A BT communication control unit 301 corresponds to a device driver for controlling the BT I/F 217, and controls data communication with an external apparatus, such as the mobile terminal 103, by BT communication. Data received via the BT communication control unit 301 is processed by a BT service control unit 302. For example, if the received data is setting information, the BT service control unit 302 stores the data in a setting information storage unit 303. The setting information storage unit 303 corresponds to a storage region of the RAM 203 or the HDD 204. In addition, the BT service control unit 302 instructs a network setting control unit 304 and a server setting control unit 305 to respectively start processing.

Based on the setting information (network setting information 410 of FIG. 4) stored in the setting information storage unit 303, the network setting control unit 304 executes a network setting for communicating with the server 104 via a network communication control unit 306. The network communication control unit 306 corresponds to a device driver for controlling the network I/F 208, and controls a data communication with an external apparatus, such as the server 104, in accordance with communication via the network 105. Based on the setting information (server setting information 420 of FIG. 4) stored in the setting information storage unit 303, the server setting control unit 305 connects to the server 104, and obtains the setting information from the server 104. The server setting control unit 305 stores the obtained setting information in the setting information storage unit 303. With this, the server setting control unit 305 causes the obtained setting information to be reflected in the settings of the printing apparatus 101. Note that the operation unit 205 and the printer unit 206 can be controlled by a control unit that is not shown graphically in FIG. 3A.

<Software Configuration of Mobile Terminal>

Figure 3B:
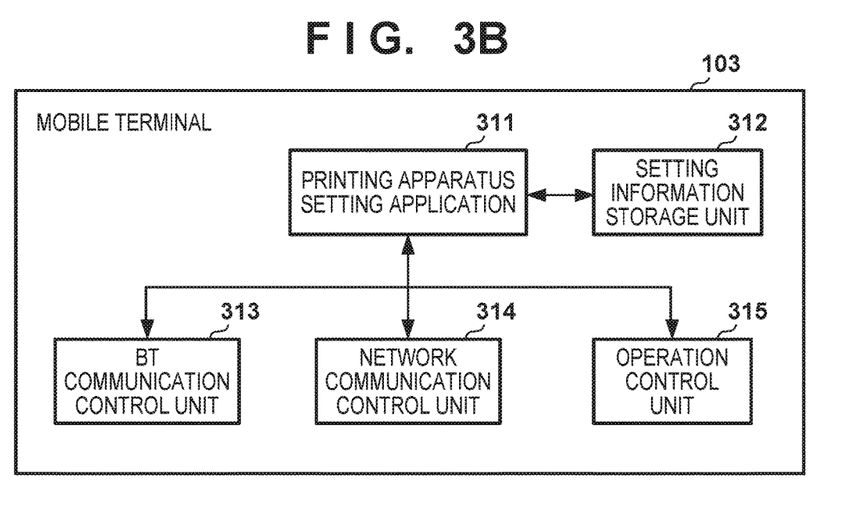
FIG. 3B is a block diagram for showing an example of a software configuration of the mobile terminal.

FIG. 3B is a block diagram for showing an example of a software configuration of the mobile terminal 103. Functions of each block illustrated in FIG. 3B and processing executed by each block is realized in the mobile terminal 103 by the CPU 211 executing a control program.

A printing apparatus setting application 311 is an application which is installed in advance in the mobile terminal 103 and is for providing to the printing apparatuses 101, 102 setting information for communicating with the server 104 via the network 105. The printing apparatus setting application 311 has a function of storing, in a setting information storage unit 312, setting information that has, for example, been obtained by a network communication control unit 314 and an operation control unit 315. In addition, the printing apparatus setting application 311 has a function of sending the setting information stored in the setting information storage unit 312 to the printing apparatuses 101, 102 via a BT communication control unit 313. Note that the printing apparatus setting application 311 may be installed by being downloaded from an external apparatus (not shown).

The setting information storage unit 312 corresponds to a storage region of the RAM 213 or the flash memory 214, and stores setting information to be provided to the printing apparatuses 101, 102. Note that the setting information storage unit 312 stores setting information for each printing apparatus (in other words, setting information corresponding to each of the printing apparatuses 101, 102 is stored separately).

The BT communication control unit 313 corresponds to a software module for controlling the BT I/F 217, and controls data communication with an external apparatus, such as the printing apparatuses 101, 102, by BT communication. The network communication control unit 314 corresponds to a software module for controlling the network I/F 218, and controls data communication with an external apparatus. Note that the mobile terminal 103 can obtain, via the network communication control unit 314, the setting information and the printing apparatus setting application 311 from an external apparatus. The operation control unit 315 corresponds to a software module for controlling the operation unit 215, and performs input/output control of the operation unit 215. For example, the printing apparatus setting application 311 can obtain, via the operation control unit 315, setting information input by an operator such as a service person using the operation unit 215.

<Example of BT Service>

Figure 4:
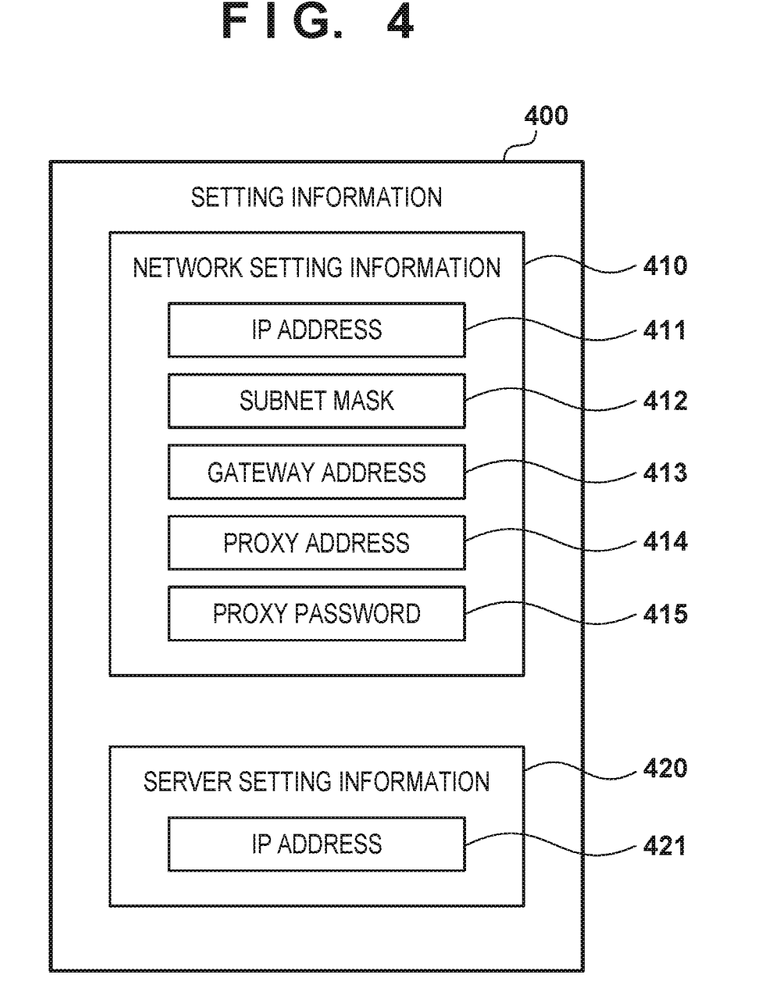
FIG. 4 is a view for illustrating an example of a BT service provided by the printing apparatus.

FIG. 4 is a view illustrating an example of a BT service that the printing apparatuses 101, 102 provide. In the printing apparatus 101 (the printing apparatus 102 is similar), the network setting information 410 and the server setting information 420 are defined as GATT profiles (Generic Attribute Profile). Upon establishing a BT connection (BLE connection) with the mobile terminal 103, the printing apparatus 101 exposes to the mobile terminal 103 those GATT profiles that have been defined in advance. Note that setting information 400, which the printing apparatus 101 holds as a GATT profile, may include information other than the information illustrated in FIG. 4 (for example, information such as a model identifier for identifying a model of the printing apparatus 101).

The network setting information 410 is configured by the following characteristics.

IP address 411:
An IP address set in the printing apparatus 101.
Subnet mask 412:
A subnet mask set in the printing apparatus 101.
Gateway address 413:
A gateway address set in the printing apparatus 101. The printing apparatus 101 needs a gateway address setting if communicating with the server 104 through a gateway.
Proxy address 414:
An IP address of a proxy server (not shown in the figure) set for the printing apparatus 101. The printing apparatus 101 needs a proxy address setting if communicating with the server 104 via a proxy server.
Proxy password 415:
An authentication password for a proxy server (not shown in the figure) set in the printing apparatus 101. If communicating with the server 104 via a proxy server that is equipped with an authentication function, the printing apparatus 101 needs a setting of a proxy password for authentication for the proxy server.

The server setting information 420 is configured by the following characteristics.

IP address 421:
The IP address of the server 104. Note that, if the printing apparatus 101 already stores the IP address of the server 104, it is not necessary to obtain the server setting information 420 from the mobile terminal 103.

<Operation of Printing Apparatus>

Figure 5:
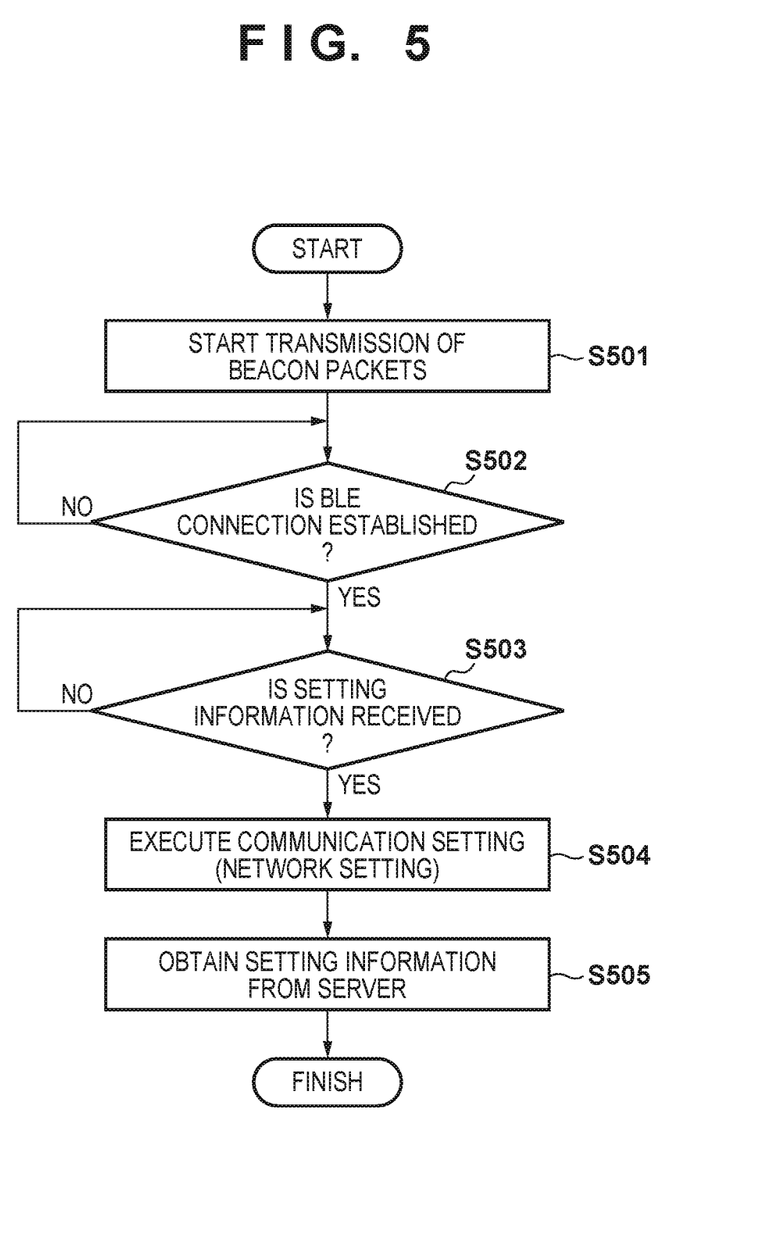
FIG. 5 is a flowchart for illustrating a processing procedure executed by the printing apparatus.

FIG. 5 is a flowchart that illustrates a procedure of processing executed by the printing apparatus 101 according to the present embodiment. FIG. 5 illustrates a procedure in which the printing apparatus 101 exposes a BT service to external apparatuses present in a vicinity thereof, receives setting information (network setting information and server setting information) from the mobile terminal 103, and obtains, based on the received setting information, additional setting information from the server 104. Note that processing of each step illustrated in FIG. 5 is realized on the printing apparatus 101 by the CPU 201 reading and executing a program stored in a storage device such as the ROM 202 or the HDD 204. In addition, similar processing is also executed in the printing apparatus 102.

Firstly, in step S501 the CPU 201 (the BT communication control unit 301) controls the BT/IF 207 so as to start processing that periodically transmits an advertisement packet of the BLE standard (hereinafter, also referred to as an "ADV packet") as a beacon packet. Specifically, transmission of ADV packets that are of an ADV_IND type is started. With this, the printing apparatus 101 enters a state in which it can accept a connection request (CONNECT_REQ) by BLE from an external apparatus (the mobile terminal 103).

In this state, when a connection request (CONNECT_REQ) is received from the mobile terminal 103, the BT I/F 207 establishes a wireless connection (a BLE connection) with (the BT I/F 217 of) the mobile terminal 103, which is the transmission source of the connection request. As a result, the printing apparatus 101 and the mobile terminal 103 enter a state in which BLE communication via the established BLE connection is possible. With such a configuration, in step S501 the CPU 201 controls the BT I/F 207 so as to periodically transmit the beacon packet, and receive a connection request from an external apparatus (the mobile terminal 103) that received the beacon packet. Note that, in step S501, the BT I/F 207 functions as an example of a wireless communication unit.

Thereafter, in step S502, the CPU 201 (the BT communication control unit 301) determines whether a BLE connection with the mobile terminal 103 succeeded (whether a BLE connection is established) as described above, and if the CPU 201 determines that the BLE connection succeeded, it advances the processing to step S503. In step S503 the CPU 201 (the BT service control unit 302) obtains, from the mobile terminal 103 and by a GATT-based communication that is performed in accordance with an ATT (Attribute Protocol), setting information for communicating with the server 104 via the network 105.

More specifically, the mobile terminal 103 operates as an ATT client, and the printing apparatus 101 operates as an ATT server. By an ATT Write Request, the mobile terminal 103 writes setting information with respect to the GATT profile (the setting information 400 illustrated in FIG. 4) of the BT service exposed by the printing apparatus 101. Information indicating whether writing of the setting information succeeded is notified to the mobile terminal 103 from the printing apparatus 101 by an ATT Notification. Note that, after establishment of the BLE connection, if such a Write Request has not been received within a predetermined interval, the BLE connection may be disconnected.

In step S503 the CPU 201 determines whether the setting information has been received from the server 104, and if the CPU 201 determines that the setting information has been received, it advances the processing to step S504. In step S504, the CPU 201 executes, based on the received setting information, a communication setting (a network setting) for communication with the server 104. Specifically, the network setting is started by network setting start being instructed from the BT service control unit 302 to the network setting control unit 304. The CPU 201 (the network setting control unit 304) sets, with respect to the network communication control unit 306, the network setting information 410 (the IP address 411 or the like) included in the setting information 400 stored in the setting information storage unit 303. As a result, the printing apparatus 101 becomes able to use the network communication control unit 306 to communicate with the server 104 via the network 105.

When such a network setting is complete, in step S505, the CPU 201 obtains setting information from the server 104. Specifically, the obtainment of setting information from the server 104 is started by a start of a connection with the server 104 being instructed from the BT service control unit 302 to the server setting control unit 305. The CPU 201 (the server setting control unit 305) tries a connection with the server 104 using the server setting information 420 (the IP address 421 or the like) included in the setting information 400 stored in the setting information storage unit 303. When a connection with the server 104 is established, the CPU 201 obtains, from the server 104 and via the established connection, setting information necessary for setting of itself. With the above, the CPU 201 terminates the processing illustrated in FIG. 5.

Note that, in step S505, while the setting information is being obtained from the server 104, BLE communication may be blocked by causing operation of the BT I/F 207 to stop. With this, because acceptance of a connection request by BLE from another apparatus ceases to occur, it is possible to prevent a situation such as where processing for causing the setting information to be obtained and reflected in the apparatus' settings is obstructed by an instruction transmitted from the another apparatus.

<Operation of Mobile Terminal>

Figure 6:
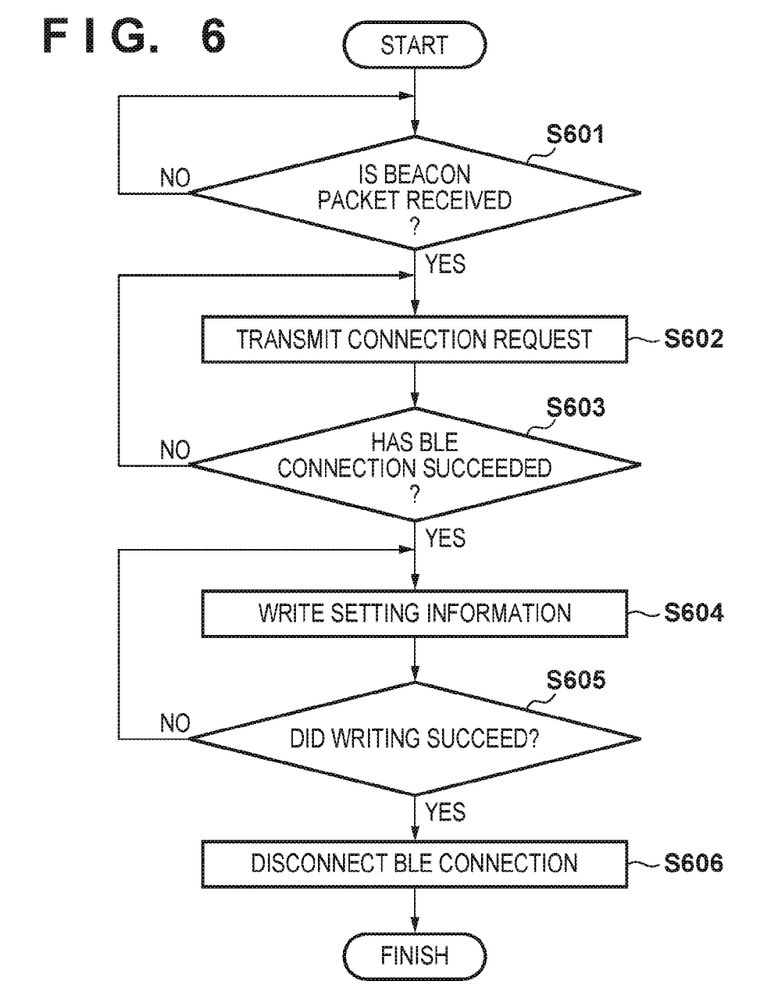
FIG. 6 is a flowchart for illustrating a processing procedure executed by the mobile terminal.

FIG. 6 is a flowchart that illustrates a procedure of processing executed by the mobile terminal 103 according to the present embodiment. In FIG. 6, a procedure in which the mobile terminal 103 writes setting information to the GATT profile (the setting information 400) of the BT service exposed by the printing apparatus 101 is illustrated. Note that processing of each step illustrated in FIG. 6 is realized on the mobile terminal 103 by the CPU 211 reading and executing a program stored in a storage device such as the flash memory 214.

When the printing apparatus setting application 311 activates in accordance with an operation on the operation unit 215 by a service person, processing illustrated in FIG. 6 is executed by the printing apparatus setting application 311 (the CPU 211). Firstly, the processing illustrated in FIG. 6 is started by the printing apparatus setting application 311 instructing the BT communication control unit 313 to start the beacon packet reception processing.

In step S601 the CPU 211 (the BT communication control unit 313) controls the BT I/F 217 so as to start processing that receives a beacon packet transmitted from the printing apparatus 101. Furthermore, the CPU 211 attempts detection of a packet transmitted by the printing apparatus 101, from ADV packets (ADV_IND) received as the beacon packets by the BT I/F 217. Based on such a detection, in step S601, the CPU 211 determines whether an ADV packet (ADV_IND) transmitted from the printing apparatus 101 has been received, and it is determined to have been received, the CPU 211 advances the processing to step S602.

In step S602, the CPU 211 (the BT communication control unit 313) controls the BT I/F 217 so as to transmit to the printing apparatus 101 a connection request (CONNECT_REQ) by BLE as a response to the ADV packet (ADV_IND). Furthermore, in step S603, the CPU 211 determines whether a BLE connection to the printing apparatus 101 has succeeded (whether a BLE connection has been established). If the CPU 211 determines that the BLE connection succeeded, it advances the processing to step S604. In contrast, if the CPU 211 determines that it failed at the BLE connection, by returning processing to step S602, it repeats transmission of the connection request (CONNECT_REQ) until a BLE connection succeeds. However, if the number of times that transmission of the connection request (CONNECT_REQ) fails reaches a predetermined number of times, the CPU 211 may display on the operation unit 215 a message indicating that the BLE connection to the printing apparatus 101 has failed, and terminate processing.

In step S604, upon establishing a BLE connection with the printing apparatus 101, the CPU 211 writes the setting information to the printing apparatus 101 (transmits to the printing apparatus 101) by GATT-based communication that is performed in accordance with an ATT (Attribute Protocol), as described above. Note that this setting information is setting information for the printing apparatus 101 to communicate with the server 104 via the network 105, and is written to the GATT profile (the setting information 400 illustrated in FIG. 4) of the BT service published by the printing apparatus 101.

Next, in step S605, the CPU 211 determines whether the writing of the setting information in step S604 succeeded.

Note that this determination processing can be performed based on information notified from the printing apparatus 101 in accordance with an ATT Notification, as described above. If the CPU 211 determines that writing of the setting information succeeded, it advances the processing to step S606. In contrast, if the CPU 211 determines that writing of the setting information failed, by returning processing to step S604, it repeats the writing of the setting information until the writing of the setting information succeeds. However, if the number of times that writing of the setting information fails reaches a predetermined number of times, the CPU 211 may display on the operation unit 215 a message indicating that writing of the setting information to the printing apparatus 101 has failed, and terminate the processing.

If the writing of the setting information to the printing apparatus 101 succeeds, in step S606, the CPU 211 controls the BT I/F 217 so as to disconnect the BLE connection with the printing apparatus 101, and terminates the processing. The BT I/F 217 disconnects the BLE connection by transmitting a disconnection request (LL_TERMINATE_IND) by BLE to the printing apparatus 101.

As explained above, in this embodiment it is possible to use the mobile terminal 103 to realize, by BLE communication, a network setting of each of the printing apparatuses 101, 102 without a service person needing to individually perform the network setting manually. Each of the printing apparatuses 101, 102 can obtain the required setting information to perform a setting for itself from the server 104 when the network setting completes and communication with the server 104 becomes possible. Therefore, by virtue of the present embodiment, it is possible to simplify an operation of a service person that is necessary for using the server 104 on the network to perform a setting of the printing apparatuses 101, 102.

Second Embodiment

In the second embodiment, processing for preventing a service person from mistakenly performing, by using the mobile terminal 103, a network setting again for a printing apparatus for which a communication setting (the network setting) is already done is applied to the first embodiment. Note that, to simplify the explanation, only portions that differ from the first embodiment are explained below.

In the printing apparatus 101 of the present embodiment, in step S501, the CPU 201 includes information, which indicates whether a communication setting (network setting) for communication with the server 104 via the network 105 has completed, in a beacon packet and transmits the beacon packet. With this, transmission of a connection request (CONNECT_REQ) from the mobile terminal 103 when the network setting has completed is suppressed.

Figure 7:
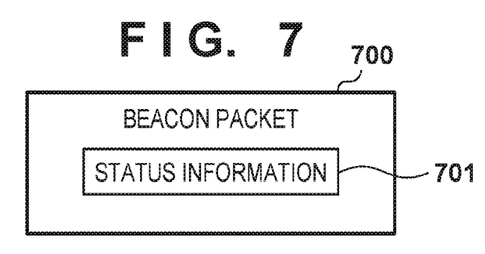
FIG. 7 is a view for illustrating an example of data within a beacon packet transmitted by the printing apparatus.

Here, FIG. 7 is a view illustrating an example of data included in a beacon packet (an ADV packet) that the printing apparatus 101 transmits in step S501. A beacon packet 700 includes one of the following two values as status information 701. Note that the beacon packet 700 may include information other than the status information 701 (for example, it may include information such as a model identifier for identifying a model of the printing apparatus 101).

DEFAULT:

DEFAULT indicates that network setting of the printing apparatus 101 has not completed, and that the printing apparatus 101 is in an initial state.

CONFIGURED:

CONFIGURED indicates that network setting of the printing apparatus 101 has already completed and that the printing apparatus 101 is in a state in which communication via the network 105 is possible.

The status information 701 is stored in the setting information storage unit 303, and used at a time of transmission of the beacon packet (step S501). In an initial state, in which a setting after a factory shipping has not been performed, the status information 701 is set to DEFAULT. After executing the network setting in step S504 and completing the network setting, the CPU 201 changes the status information 701 from DEFAULT to CONFIGURED.

When the mobile terminal 103 receives a beacon packet from the printing apparatus 101 (step S601), it confirms the status information 701 included in the beacon packet. If DEFAULT is set in the status information 701, the mobile terminal 103 transmits the connection request in step S602, whereas if CONFIGURED is set in the status information 701, the mobile terminal 103 does not transmit the connection request in step S602.

By virtue of the present embodiment, it is possible to prevent a service person from using the mobile terminal 103 to mistakenly perform a network setting again with respect to a printing apparatus for which a communication setting (network setting) has already been done.

Third Embodiment

In the third embodiment, explanation is given of a variation of the second embodiment. In the present embodiment, processing for, similarly to in the second embodiment, preventing a service person from using the mobile terminal 103 to mistakenly perform a network setting again with respect to a printing apparatus for which a network setting has already been done is applied to the first embodiment. Note that, to simplify the explanation, only portions that differ from the first and second embodiments are explained below.

In the printing apparatus 101 of the present embodiment, in step S501, the CPU 201 controls the BT I/F 207 to transmit a beacon packet if a network setting for communication with the server 104 via the network 105 has not completed. In contrast, in step S501, if the network setting is already completed, the CPU 201 controls the BT I/F 207 so as to not transmit a beacon packet.

Specifically, in step S501, if the status information 701 stored in the setting information storage unit 303 is set to DEFAULT, the CPU 201 controls the BT I/F 207 so as to transmit the beacon packet. In contrast, if the status information 701 is set to CONFIGURED, the BT I/F 207 is controlled so as to not transmit the beacon packet, and processing of step S505 is executed next.

By virtue of the present embodiment, if a network setting of the printing apparatus 101 is already done, the printing apparatus 101 does not transmit a beacon packet, and a BLE connection between the mobile terminal 103 and the printing apparatus 101 is not established. In other words, because it is not possible to transmit the setting information by BLE communication from the mobile terminal 103, it is possible to prevent a service person from using the mobile terminal 103 to mistakenly perform network setting for the printing apparatus 101 again.

Note that at a time of activation of the printing apparatus 101, the CPU 201 may confirm the status information 701 stored in the setting information storage unit 303, and forcibly cause the BT I/F 207 to operate, and start transmission of the beacon packet if DEFAULT is set. With this, if the printing apparatus 101 is in an initial state, it is possible to cause the printing apparatus 101, in accordance with its activation, to automatically transition to a state in which network setting that uses the mobile terminal 103 can be performed, without needing an operation of a service person with respect to the printing apparatus 101.

Fourth Embodiment

In the fourth embodiment, explanation is given of an embodiment by which, from a security perspective, only a specific operator (i.e., a service person) can perform the network setting that uses the mobile terminal 103. Note that, to simplify the explanation, only portions that differ from the first through third embodiments are explained below.

<Operation Mode for Service Person>

The printing apparatus 101 of the present embodiment may operate so as to accept a connection request by BLE from the mobile terminal 103 in accordance with the procedure of FIG. 5 only while operating in a specific operation mode for a service person. In other words, a specific operation mode for network setting that uses the mobile terminal 103 may be arranged as an operation mode in which a service person can set by operating the operation unit 205. Such an operation mode is a mode in which, for example, a specific operation screen is displayed for initial setting of the printing apparatus 101 on a display module of the operation unit 205, and an operation by an operator (the service person) is accepted.

Alternatively, if the printing apparatus 101 has a special activation mode, such as an initial installation mode or a recovery mode, it may be operated to accept a connection request by BLE from the mobile terminal 103 only when such activation mode has been activated.

<Authentication Processing>

When a connection request has been received (step S502), the CPU 201 may perform authentication of the mobile terminal that transmitted the connection request, reject the connection request if authentication did not succeed, and control the BT I/F 207 so as to establish a BLE connection with the mobile terminal if the authentication succeeded. Note that, such authentication processing may be realized by password authentication or the like. Alternatively, to prevent authentication information such as a password from being extracted from the mobile terminal 103 by spoofing the printing apparatus 101, mutual authentication, by which authentication processing is also performed on the mobile terminal 103 side and not only the printing apparatus 101 side, may be performed.

Other Embodiments

In each of the foregoing embodiments, explanation was given of examples that use BLE in transmission and reception of setting information between the mobile terminal 103 and the printing apparatuses 101, 102, but it is also possible to perform transmission and reception of the setting information by wireless communication in accordance with another communication standard. For example, in place of a BLE standard, a NFC (Near Field Communication) standard may be used. In other words, the mobile terminal 103 and the printing apparatuses 101, 102 may perform transmission and reception of setting information by wireless communication in accordance with an NFC standard.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087785, filed Apr. 22, 2015, which is hereby incorporated by reference herein in its entirety.

What is claimed is:

1. An information processing apparatus comprising:
a wireless communicator that periodically transmits a beacon packet;
a memory that stores instructions; and
a processor that executes the instructions to:
in a case where network setting information is received by the wireless communicator from an external apparatus, set the network setting information for the information processing apparatus; and
control the information processing apparatus to connect to a server, in a case where setting of the network setting information for the information processing apparatus is completed,
wherein before the network setting information is set for the information processing apparatus, first status information indicating that the network setting information has not been set for the information processing apparatus is included in the beacon packet, and
after the setting of the network setting information is completed, second status information indicating that the network setting information has been set for the information processing apparatus is included in the beacon packet.

2. The information processing apparatus according to claim 1, wherein
the beacon packet is an advertisement packet of BLE (Bluetooth Low Energy).

3. The information processing apparatus according to claim 1, wherein
the wireless communicator further receives address information of the server from the external apparatus, and
the information processing apparatus connects to the server using the address information.

4. The information processing apparatus according to claim 1, wherein
the network setting information includes at least an IP address.

5. The information processing apparatus according to claim 4, wherein
the network setting information further includes at least one of a gateway address and a proxy address.

6. The information processing apparatus according to claim 1, wherein
the information processing apparatus is a printing apparatus that executes print processing.

7. The information processing apparatus according to claim 1, wherein
the information processing apparatus obtains, from the server, setting information for the information processing apparatus.

8. A method for controlling an information processing apparatus, the method comprising:
periodically transmitting a beacon packet using a wireless communicator;
in a case where network setting information is received by the wireless communicator from an external apparatus, setting the network setting information for the information processing apparatus; and
controlling the information processing apparatus to connect to a server, in a case where setting of the network setting information for the information processing apparatus is completed;
wherein before the network setting information is set for the information processing apparatus, first status information indicating that the network setting information has not been set for the information processing apparatus is included in the beacon packet; and
after the setting of the network setting information is completed, second status information indicating that the network setting information has been set for the information processing apparatus is included in the beacon packet.

9. An information processing apparatus comprising:
a wireless communicator that periodically transmits a beacon packet;
a memory that stores instructions; and
a processor that executes the instructions to:
in a case where network setting information is received by the wireless communicator from an external apparatus, set the network setting information for the information processing apparatus; and
control the information processing apparatus to connect to a server, in a case where setting of the network setting information for the information processing apparatus is completed,
wherein before the network setting information is set for the information processing apparatus, status information indicating that the network setting information has not been set for the information processing apparatus is included in the beacon packet, and
after the setting of the network setting information is completed, the status information is not included in the beacon packet.

10. The information processing apparatus according to claim 9, wherein the beacon packet is an advertisement packet of BLE (Bluetooth Low Energy).

11. The information processing apparatus according to claim 9, further comprising
receiving address information of the server from the external apparatus, and
connecting the information processing apparatus to the server using the address information.

12. The information processing apparatus according to claim 9, wherein
the network setting information includes at least an IP address.

13. The information processing apparatus according to claim 12, wherein
the network setting information further includes at least one of a gateway address and a proxy address.

14. The information processing apparatus according to claim 9, wherein
the information processing apparatus is a printing apparatus that executes print processing.

15. The information processing apparatus according to claim 9, wherein
the information processing apparatus obtains, from the server, setting information for the information processing apparatus.

16. A method for controlling an information processing apparatus, comprising the steps of:
periodically transmitting a beacon packet using a wireless communicator;
in a case where network setting information is received by the wireless communicator from an external apparatus, setting the network setting information for the information processing apparatus; and
controlling the information processing apparatus to connect to a server, in a case where setting of the network setting information for the information processing apparatus is completed,
wherein before the network setting information is set for the information processing apparatus, status information indicating that the network setting information has not been set for the information processing apparatus is included in the beacon packet, and
after the setting of the network setting information is completed, the status information is not included in the beacon packet.

17. An information processing apparatus comprising:
a wireless communicator that periodically transmits a beacon packet;
a memory that stores instructions; and
a processor that executes the instructions to:
in a case where network setting information is received by the wireless communicator from an external apparatus, set the network setting information for the information processing apparatus; and
control the information processing apparatus to connect to a server, in a case where setting of the network setting information for the information processing apparatus is completed,
wherein after the setting of the network setting information is completed, status information indicating that the network setting information has been set for the information processing apparatus is included in the beacon packet, and
before the network setting information is set for the information processing apparatus, the status information is not included in the beacon packet.

18. The information processing apparatus according to claim 17, wherein the beacon packet is an advertisement packet of BLE (Bluetooth Low Energy).

19. The information processing apparatus according to claim 17, wherein the wireless communicator further receives address information of the server from the external apparatus, and
the information processing apparatus connects to the server using the address information.

20. The information processing apparatus according to claim 17, wherein the network setting information includes at least an IP address.

21. The information processing apparatus according to claim 20, wherein the network setting information further includes at least one of a gateway address and a proxy address.

22. The information processing apparatus according to claim 17, wherein the information processing apparatus is a printing apparatus that executes print processing.

23. The information processing apparatus according to claim 17, wherein the information processing apparatus obtains, from the server, setting information for the information processing apparatus.

24. A method for controlling an information processing apparatus, the method comprising:
periodically transmitting a beacon packet using a wireless communicator;
in a case where network setting information is received by the wireless communicator from an external apparatus, setting the network setting information for the information processing apparatus; and
controlling the information processing apparatus to connect to a server, in a case where setting of the network setting information for the information processing apparatus is completed,
wherein after the setting of the network setting information is completed, status information indicating that the network setting information has been set for the information processing apparatus is included in the beacon packet, and
before the network setting information is set for the information processing apparatus, the status information is not included in the beacon packet.

* * * * *